(12) United States Patent
Simmons et al.

(10) Patent No.: US 9,494,760 B2
(45) Date of Patent: Nov. 15, 2016

(54) HIGHLY CONFIGURABLE FIBER-OPTIC INTERCONNECTION TRAY

(71) Applicant: 3M INNOVATIVE PROPERTIES COMPANY, St. Paul, MN (US)

(72) Inventors: Richard L. Simmons, Leander, TX (US); Zachary M. Thompson, Austin, TX (US); Jeffrey L. Shields, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/001,734

(22) Filed: Jan. 20, 2016

(65) Prior Publication Data

US 2016/0238811 A1 Aug. 18, 2016

Related U.S. Application Data

(60) Provisional application No. 62/117,068, filed on Feb. 17, 2015.

(51) Int. Cl.
*G02B 6/00* (2006.01)
*G02B 6/44* (2006.01)

(52) U.S. Cl.
CPC ........... *G02B 6/4455* (2013.01); *G02B 6/4452* (2013.01); *G02B 6/4477* (2013.01)

(58) Field of Classification Search
None
See application file for complete search history.

(56) References Cited

U.S. PATENT DOCUMENTS

| | | | |
|---|---|---|---|
| 6,504,986 B1 | 1/2003 | Wambeke et al. | |
| 6,507,691 B1 | 1/2003 | Hunsinger et al. | |
| 6,539,160 B2 | 3/2003 | Battey et al. | |
| 7,190,874 B1 | 3/2007 | Barth et al. | |
| 7,349,616 B1 | 3/2008 | Castonguay et al. | |
| 7,352,945 B2 | 4/2008 | Holmberg et al. | |
| 7,406,242 B1 | 7/2008 | Braga | |
| 7,697,812 B2 | 4/2010 | Parikh et al. | |
| 8,189,983 B2 | 5/2012 | Brunet et al. | |
| 8,837,894 B2 | 9/2014 | Holmberg et al. | |
| 2007/0047892 A1 | 3/2007 | Bayazit et al. | |
| 2009/0074371 A1 | 3/2009 | Bayazit et al. | |
| 2011/0211799 A1* | 9/2011 | Conner | G02B 6/4471 385/135 |
| 2011/0255837 A1 | 10/2011 | Solheid et al. | |
| 2015/0023645 A1* | 1/2015 | Boelen | G02B 6/4455 385/135 |

FOREIGN PATENT DOCUMENTS

EP 2261711 A2 12/2010

OTHER PUBLICATIONS

"3M™ Fiber Dome Closure FDC 10 with 3M™ Fiber Optic Splice Tray 2541", 2008, 20 pages.

(Continued)

*Primary Examiner* — Ryan Lepisto
*Assistant Examiner* — Erin Chiem
(74) *Attorney, Agent, or Firm* — Janet A. Kling

(57) ABSTRACT

The present description relates to an optical fiber interconnection tray. The interconnection tray has a base extending longitudinally from a first end to a second end, with a cable entrance at the first end of the tray. A first interconnection layer is disposed on the base, and a second interconnection layer is positioned over at least a portion of the first interconnection layer, wherein the second interconnection layer is disposed on a first repositionable mezzanine attached to the base at a plurality of locations.

17 Claims, 18 Drawing Sheets

(56) References Cited

OTHER PUBLICATIONS

"TE Connectivity | 061064-000 | FOSC-ACC-D-TRAY-RIBN-24 288-F Mass Fusion Ribbon Splice Tray for D Size Closure", [online]; Anixter Inc., 2015, [retrieved from the internet on Feb. 24, 2015], URL <https://www.anixter.com/en_ca/product-detail.061064-000-TE-CONNECTIVITY.PS-Fiber-Optic-Splices.389687.html>, 1 page.

International Search Report for PCT/US2016/014075, mailed on Aug. 16, 2016, 4 pp.

\* cited by examiner

HIGHLY CONFIGURABLE FIBER-OPTIC INTERCONNECTION TRAY

FIELD

The present description relates to a reconfigurable interconnection tray. In particular, the exemplary interconnection tray includes a first interconnection layer disposed on the base, and a second interconnection layer positioned over at least a portion of the first interconnection layer.

BACKGROUND

Telecommunication cables are used for distributing data across vast networks. Modern communication and data networks rely on fiber optic transmission lines or cables due to their high speed and low attenuation characteristics. As these fiber optic cables are routed across networks, it is necessary to periodically open the cable and splice or tap into the cable so that data may be distributed to "branches" of the network. The branches may be further distributed until the network reaches individual homes, businesses, offices, and so on. The distributed lines are often referred to as drop lines. At each fiber access point where the cable is opened, it is necessary to provide some type of enclosure to protect the cable (and potentially unjacketed fiber) and allow easy and repeated access to the cable. These enclosures need to provide features to store the fiber optic lines as well as allow for the interconnection between the incoming and outgoing fiber optic lines.

The purpose and configuration of the enclosure will vary depending on where the enclosure is located in a network. When an enclosure is used to interconnect distribution lines, the number of splices that can be made in the enclosure is a factor in determining which enclosure and which accessories within the enclosure are used. Frequently, telecommunication carriers want to use the smallest enclosure that can accommodate the needed number of splices due to factors like the cost of the enclosure, cost of installation, as well as aesthetics for above grade installations. At another point in the network an enclosure can be used to distribute signals from a few optical fibers to many optical fibers through the use of optical splitters. While in another application, an enclosure may also contain a termination field for interconnecting optical fiber connectors.

As networks expand telecommunication carriers may want to add a cable to an existing fiber access point to increase capacity of a portion of the network or bring service to an area which did not have high speed, gigabit service previously. In order to do this the optical fiber interconnection capacity of enclosures at these fiber access points needs to increase.

Trays are a primary component used within communication enclosures to house optical fiber interconnection components such as optical fiber splices, optical splitters and the like. In order to increase the number of optical fiber splices within an enclosure, conventional practice is to simply add another tray, but this may not be possible due to volume constraints of the enclosure, installation requirements (e.g. slack storage requirements), the type of tray being used as well as the design criteria of the tray itself such as splice capacity, tray dimensions, etc. Thus, there is a need for a tray that can support not only the breadth of optical fiber interconnection means used at fiber access points, but can also support capacity expansion of the fiber access point.

SUMMARY

The present description relates to an optical fiber interconnection tray. In a first embodiment, the interconnection tray has a base extending longitudinally from a first end to a second end, wherein the base includes a cable entrance at the first end of the tray. A first interconnection layer is disposed on the base, and a second interconnection layer is positioned over at least a portion of the first interconnection layer, wherein the second interconnection layer is disposed on a first repositionable mezzanine attached to the base at a plurality of locations between the first end and the second end of the base.

In a second embodiment, an optical fiber interconnection tray has a base extending longitudinally from a first end to a second end, wherein the base includes a cable entrance at the first end of the tray. A first interconnection layer is disposed on the base wherein the first interconnection layer comprises a reconfigurable optical splitter holder, and a second interconnection layer is positioned over at least a portion of the first interconnection layer wherein the second interconnection layer comprises a plurality of optical fiber connector adapters mounted in an adapter mounting plate.

In a third embodiment, an optical fiber interconnection tray has a base extending longitudinally from a first end to a second end, wherein the base includes a cable entrance at the first end of the tray. A plurality of optical component inserts spaced above the base of the interconnection tray wherein each of the plurality of optical component inserts is disposed on a repositionable mezzanine creating space between the optical component insert and the base of the interconnection tray. A slack storage region is disposed between the optical component inserts and the base of the interconnection tray in the space created by the repositionable mezzanines.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1:
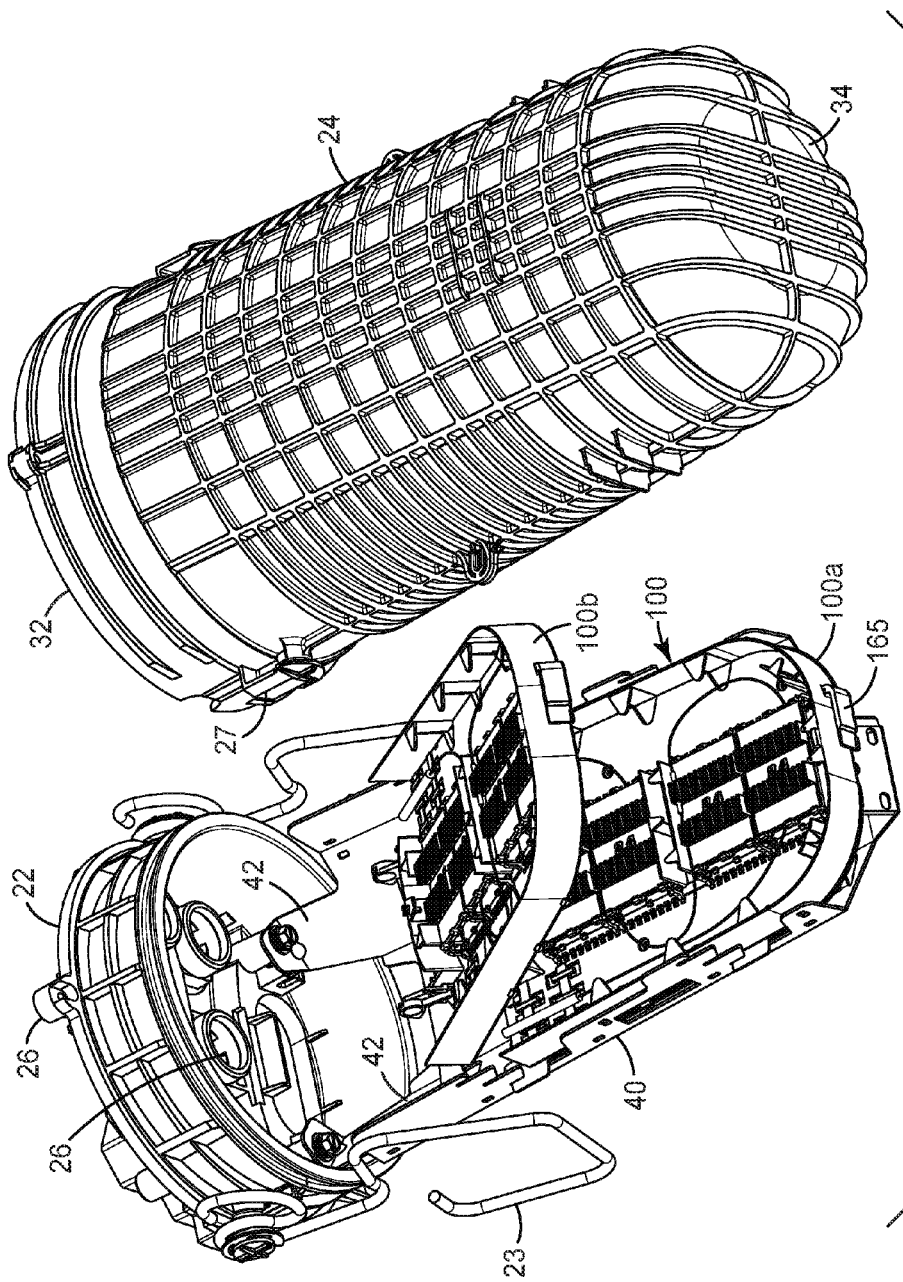
FIG. 1 is an isometric view of an enclosure that can be used at a fiber access point according to an aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "coupled with" or "in contact with" another element, component or layer, it can be directly on, directly coupled with, in direct contact with, or intervening elements, components or layers may be on, connected, coupled or in contact with the particular element, component or layer, for example. When an element, component or layer for example is referred to as being "directly on," "directly coupled with," or "directly in contact with" another element, there are no intervening elements, components or layers for example.

The interconnection tray described herein is a highly configurable tray that can be used to interconnect optical fibers. The optical fibers can be in the form of individual 250 µm coated optical fibers, 900 µm buffer coated optical fibers, small diameter jacketed cables, optical fibers contained in buffer tubes, or optical ribbon fibers.

FIG. 1 shows an exemplary enclosure 20 according to one embodiment of the invention. The enclosure 20 includes a base member 22 and a housing 24 removeably securable to the base member 22. The base member 22 includes at least one port 26 for receiving a telecommunications cable (not shown). The ports 26 allow passage of a single cable, or multiple cables in combination with a sealing member as is known in the art. The base member 22 may have one, two, or any other number of ports 26 required for a particular enclosure 20. The housing 24 is hollow and defines a longitudinal internal cavity extending from a first end 32 to a second end 34 of the housing 24. An opening at the first end 32 of the housing 24 is shaped and sized to fit over and engage with the base member 22 in a conventional manner (e.g. engagement of a securing mechanism 23 attached to the base member with protruding knobs 27 located on the exterior surface of the housing). When engaged, the base member 22 and housing 24 provide protection for the internal components of the enclosure 20 from weather, insects and other external hazards.

A support frame or basket 40 is secured to the base member 22 by one or more mounting bracket portions 42 (FIG. 4A) extending from the support frame 40 by any conventional means including, but not limited to bolts, screws, interlocking elements on the support frame 40 and base member 22, adhesive, or any other suitable means. The support frame 40 is shaped to extend longitudinally into the internal cavity of the housing 24 when the enclosure 20 is closed.

The support frame 40 is configured to support, maintain and manage telecommunication lines and splices in several different manners, depending upon the requirements of a particular installation. In one implementation, the support frame can support at least one interconnection tray 100 while the support frame also provides adequate space within its U-shaped interior region for cable slack storage.

A first interconnection tray 100a can be attached to a support platform that spans the U-shaped interior region of the support frame by a conventional fastener, such as an adhesive, tape or mechanical connection (e.g. screws, rivets, hook and loop fastener, etc.). Additional interconnection trays 100b can be either stacked on top of the first interconnection tray, be pivotally attached to the first interconnection tray or be pivotally attached to the interconnection tray directly beneath it in the stack.

In the exemplary aspect shown in FIG. 1, a plurality of self-stacking hinged interconnection trays 100a, 100b are shown. An exemplary embodiment of an interconnection tray usable with enclosure 20 is described relative to FIGS. 2 and 3A-3B. Interconnection tray 100 has tray body 101 comprising a base 102 extending longitudinally from a first end 103a to a second end 103b, wherein the base includes a cable entrance 105 at the first end of the tray and a side wall 108 extending from the base from a first corner 104a at the first end of the base around the second end of the base to a second corner 104b at the first end of the base. Each interconnection tray includes an interconnection area 130 along its longitudinal central axis and a fiber routing area 110 around the interior circumference of the interconnection tray. In an exemplary aspect, the interconnection area on the interconnection tray can have a shallow channel formed in the base that is configured to accept a plurality of optical component inserts 170a-170c, each optical component insert holding a plurality of optical components (not shown).

In one aspect, interconnection tray 100 can include two cable entrances 105 adjacent to the first and second corners at the first end of the tray and an end wall 109 disposed between the cable entrances. A plurality of tie down points 105a can be provided at each cable entrance to strain relieve cables entering and exiting the exemplary interconnection tray.

Interconnection tray 100 can optionally include an auxiliary strain relief plate 106 disposed in cable entrance 105 to handle a larger number of optical fibers, buffer tube or ribbon fibers entering the interconnection tray. Auxiliary strain relief plate 106 includes a plurality of tie down points 106a to strain relieve cables entering and exiting the exemplary interconnection tray. The auxiliary strain relief plate is positioned by engaging pin 105c in the edge of the cable entrance with hole 106c in the auxiliary strain relief plate and support 106d in aperture 105d in the base of the interconnection tray. Auxiliary strain relief plate is secured in cable entrance 105 by the engagement of latch arm 105b that extends from the base of the cable entrance with the receiving lip 106b on the auxiliary strain relief plate.

Interconnection tray 100 can further include one or more guide walls 112 to help define the fiber routing area 110. The fiber routing area can be used to store excess lengths of fiber between the guide walls and the outer walls of the tray (i.e. sidewall 108 and end wall 109) as well as routing optical fibers to and from interconnection area 130. A plurality of tabs 118 can extend from the top edges of the outside walls of the interconnection tray and the guide walls to help retain the optical fibers within the boundaries of the interconnection tray.

An optional cover (not shown) can be fitted to each interconnection tray after all fiber connections are made and any excess lengths of fiber have been installed within the interconnection tray.

Figure 3A:
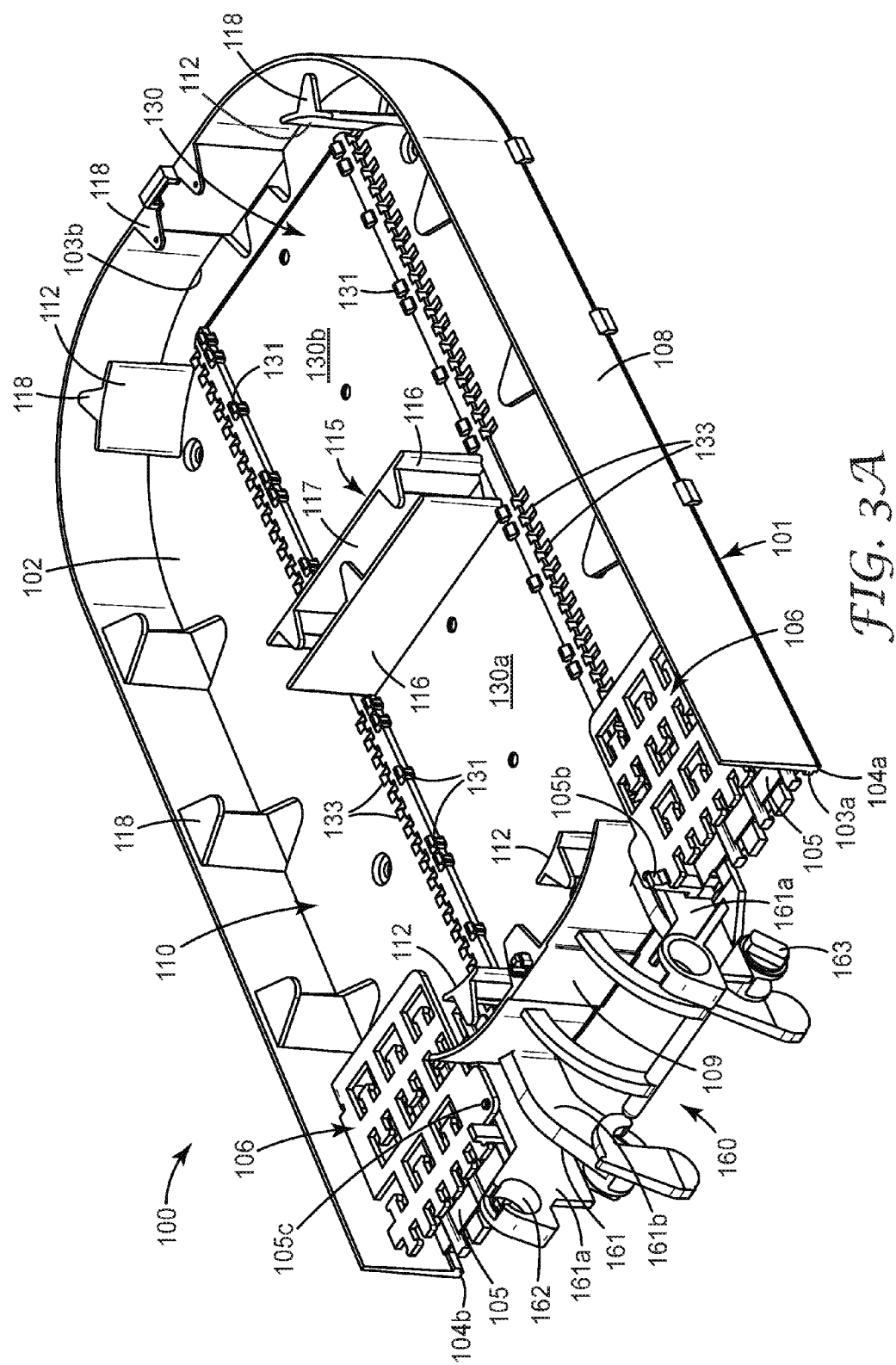
FIGS. 3A and 3B are isometric views of a tray body of the interconnection tray of FIG. 2.

Each of interconnection trays 100 can be pivotally mounted to the interconnection tray beneath it by a hinging mechanism 160 disposed at the first end 103a of the tray body 101 as shown in FIG. 3A. In one aspect, the hinging mechanism can be integrally formed with the tray. The hinging mechanism includes plurality of legs 161 extending first end 103a of the tray body 101 and each leg includes a first leg portion 161a and a second leg portion 161b. The first leg portion can be slightly longer than the second leg portion allowing the trays to be offset from one another in a stepped arrangement when stacked, thus permitting free access to the interconnection tray beneath it when an interconnection tray is rotated to an open position. The first leg portion can have a pivot recess 162 formed on the end thereof and the second leg portion can have a pivot projection 163 formed near its end. In use the pivot projection is configured to engage with the pivot recess of the tray disposed beneath it in the tray stack. Alternatively, the hinging mechanism can be a separate part that clips on to the first end of the exemplary interconnection tray.

Additionally, each of the interconnection trays may have a latch 165 (shown in FIG. 1) at an end opposite the hinging mechanism to lock the tray in a closed position relative to the tray beneath it.

The interconnection area 130 can accommodate a variety of cable connection devices such as optical fiber splices (e.g. mechanical splices, fusion splices, mass fusion splices or mass mechanical splices) and optical connector adapters as well as optical splitters. The splices can be disposed in conventional splice inserts; the optical splitter can be disposed in an optical splitter holder and the optical fiber adapter can be held in a modular adapter plate. In an exemplary aspect, the interconnection area can include a first interconnection layer disposed on a base of the interconnection tray, and a second interconnection layer positioned over at least a portion of the first interconnection layer.

In some embodiments, interconnection tray 100 can further include a fiber chase extending from the base of the tray body. For example, FIG. 3A shows a fiber chase 115 extending across the base 102 perpendicular to the longitudinal axis of the tray body 101 and divides the interconnection area into two zones. The fiber chase provides a fiber crossover point in the middle of the interconnection tray. The fiber chase is comprised of a channel 117 disposed between a pair of chase walls 116 and is configured to provide a convenient guiding feature when one or more fibers need to change the direction they are wrapped in the tray.

A first zone 130a is disposed between the first end 103a of interconnection tray 100 and fiber chase 115 and a second zone 130b is disposed between the fiber chase and the second end 103b of the interconnection tray. Each zone is designed to allow the end user adequate flexibility to fit their fiber interconnection, storage, and fiber routing needs. In the interconnection tray 100, the end user can place one to four optical component inserts at one end of the interconnection tray and use the other end for storage using the fiber chase and the second zone for the storage of loops of excess fiber or ribbon fiber. Alternatively, the end user can place optical component inserts in both zones in interconnection area 130 as shown in FIG. 2.

Figure 2:
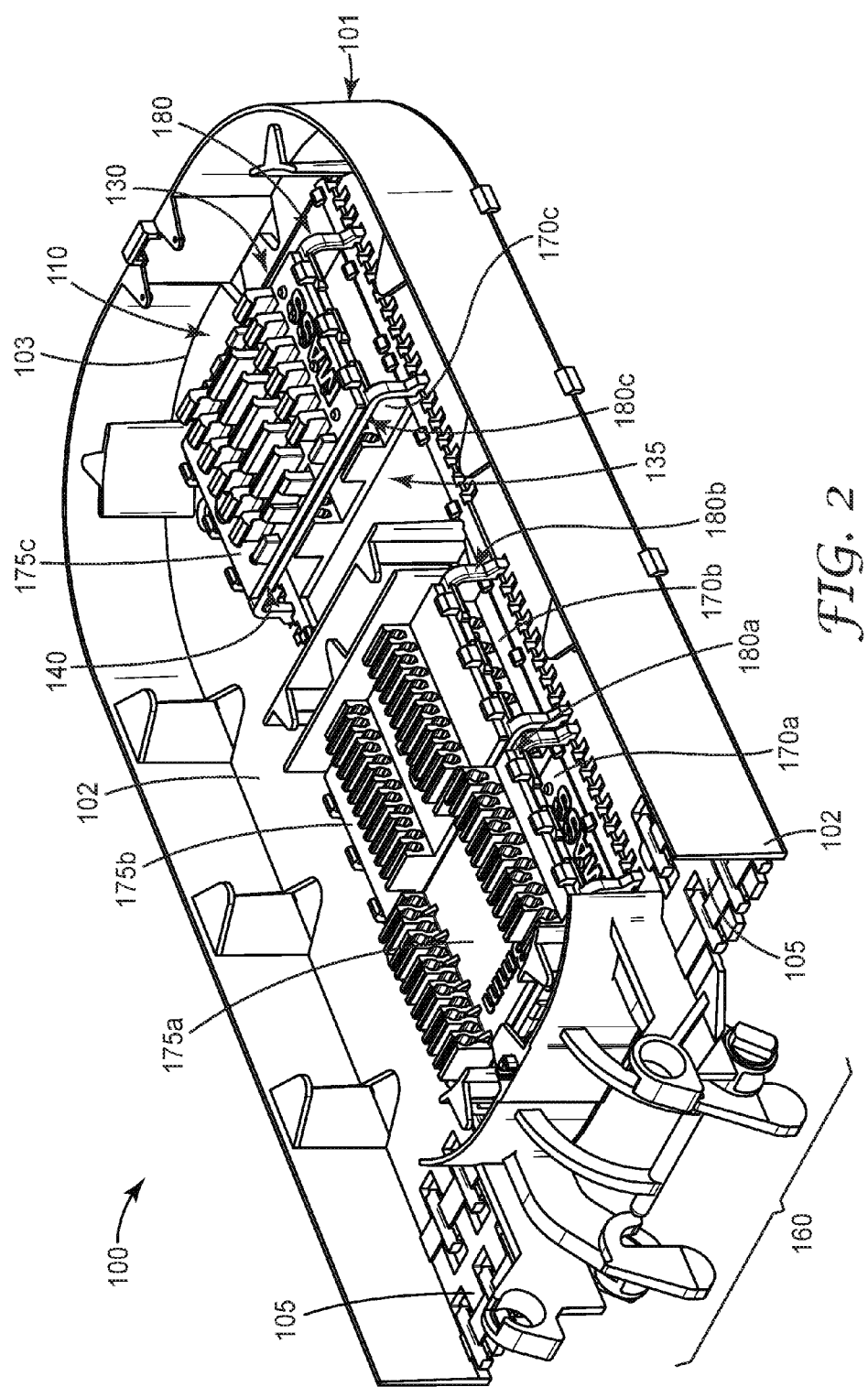
FIG. 2 is an isometric view of a first configuration of an optical fiber interconnection tray according to an aspect of the invention.
Figure 3B:
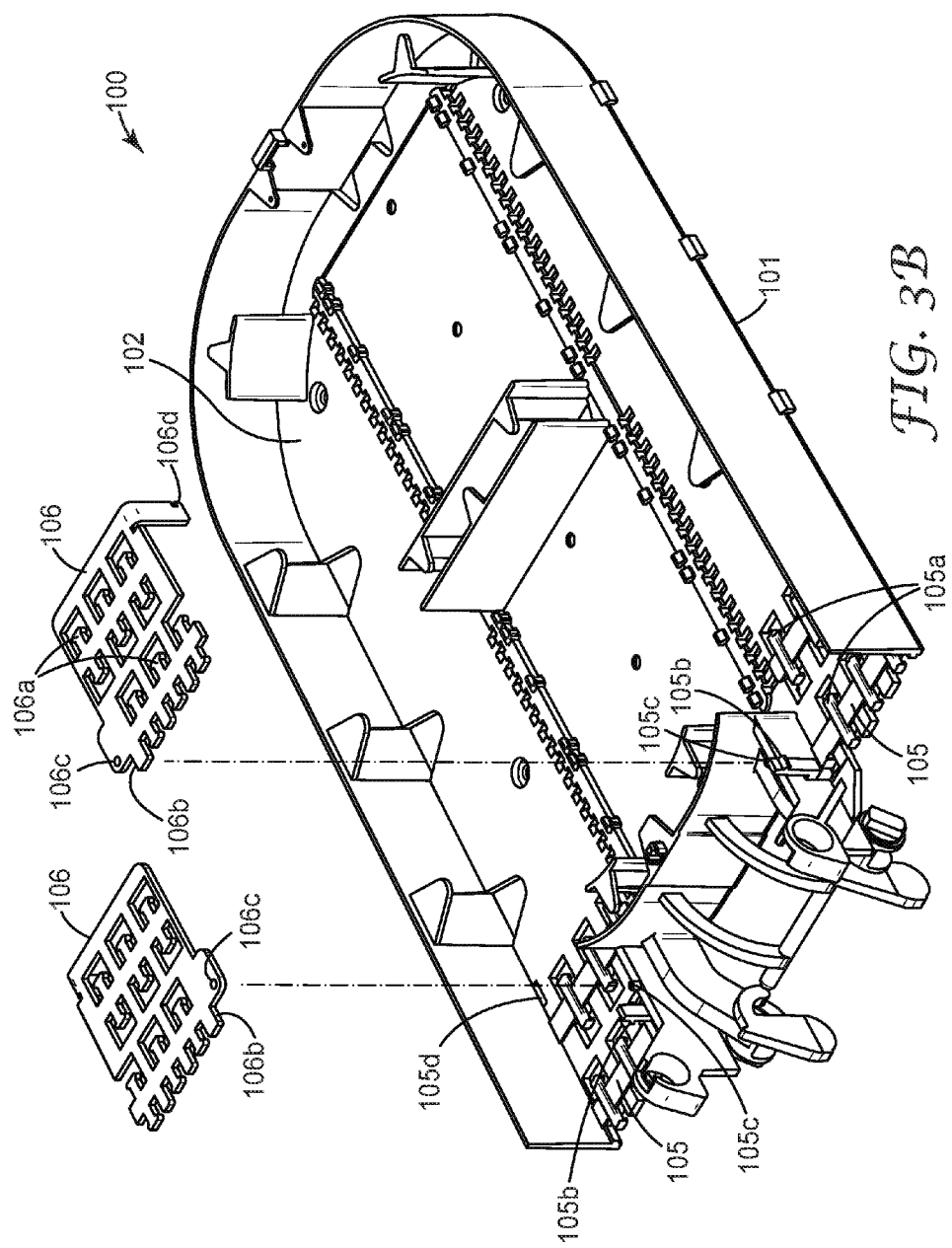

Referring now to FIG. 2, interconnection tray 100 includes a first interconnection layer 135 disposed in the interconnection area 130 on the base of the tray body, and a second interconnection layer 140 positioned over at least a portion of the first interconnection layer, wherein the second interconnection layer is disposed on a first repositionable mezzanine 180 that can be attached to the base at a plurality of locations between the first end and the second end of the base.

In an exemplary aspect, interconnection tray 100 includes a first interconnection layer 135 having a first plurality of optical component inserts 170 (e.g. optical component inserts 170a, 170b, 170c) disposed on the base 102 of the interconnection tray, and a second interconnection layer 140 having a second plurality of optical component inserts 175 (e.g. optical component inserts 175a, 175b, 175c), each of which is disposed on a separate repositionable mezzanine 180 that is secured to the base of the interconnection tray over a corresponding one of first plurality of optical component inserts of the first interconnection layer.

A first optical component insert 170 can be secured the base of the interconnection tray to create the first interconnection layer and a second optical component insert 175 can be secured to a repositionable mezzanine 180 which can be attached to the base over at least a portion of the first interconnection layer. In the exemplary aspect shown in FIG. 2, the first interconnection layer includes three first optical component inserts 170a, 170b, 170c disposed in a shallow channel formed in the base 102, and the second interconnection layer includes three second optical component inserts 175a, 175b, 175c elevated above the first optical inserts by repositionable mezzanines 180a, 180b and 180c, respectively. Each of the optical component inserts holds a plurality of optical components (not shown). The first optical component inserts 170 (e.g. first optical component inserts 170a, 170b, 170c) can be secured to the base by an adhesive, such as a piece of double sided tape or a transfer adhesive, or by engaging with first insert catches 131 disposed along the edges of interconnection area 130. Similarly, the second optical component inserts 175 (e.g. second optical component inserts 175a, 175b, 175c) can be either adhesively or mechanically secured to the repositionable mezzanine. Utilizing the repositionable mezzanine allows for splice inserts to be stacked, essentially doubling the interconnection density (e.g. splice count) for a given amount of area in the interconnection tray.

Exemplary optical component inserts are used to secure/organize and/or identify the optical components stored therein. Conventional optical component inserts may be made of a foam, an elastomer, a rubber or a plastic material which can be secured in interconnection tray by either an adhesive or by mechanical means. In one aspect, Optical component inserts can be configured to hold individual mechanical splices such as 3M™ Fibrlok™ II Universal Optical Fiber Splice 2529 or 3M™ Fibrlok™ 250 μm Fiber Splice 2540 available from 3M company (St. Paul, Minn.), or individual fusion splices (2.4 mm fusion splices or 3 mm fusion splices) such as 3M™ Fiber Optic Splice Sleeve (3 mm sleeves) or 3M™ BPEO Fiber Optic Splice Sleeve (2.4 mm sleeves) also available from 3M company. In another aspect, Optical component inserts can be configured to hold mass fusion splices or mass mechanical splices. Conventional optical component inserts that are configured to hold fusion splices include 2.4 mm Single Fusion Splice Insert, 3.0 mm Single Fusion Splice Insert, 12RF Mass Fusion Splice Insert, each of which is available from 3M Company.

In another aspect, the optical component insert can be configured to hold one or more optical splitters (see, for example, splitter holder 270b shown in FIGS. 6, 7 and 8A and 8B). Optical component insert 270b includes a base portion 271b having a generally rectangular shape such that it can be secured within interconnection area 230 on interconnection tray 200 (FIG. 6) or on a repositionable mezzanine as described previously. In an exemplary aspect, Optical component insert 270b can be configured to hold one or more optical splitters. In the exemplary embodiment shown in FIG. 7, the optical component insert has been configured to hold a 1×32 optical splitter and a 1×16 optical splitter, however other splitter combinations are possible including accommodating two optical splitters of the same type. In addition, it is anticipated that this type of component insert or holder can accommodate other small optical components such as wavelength division multiplexing devices, fan-out devices or furcation bodies, and the like.

Figure 6:
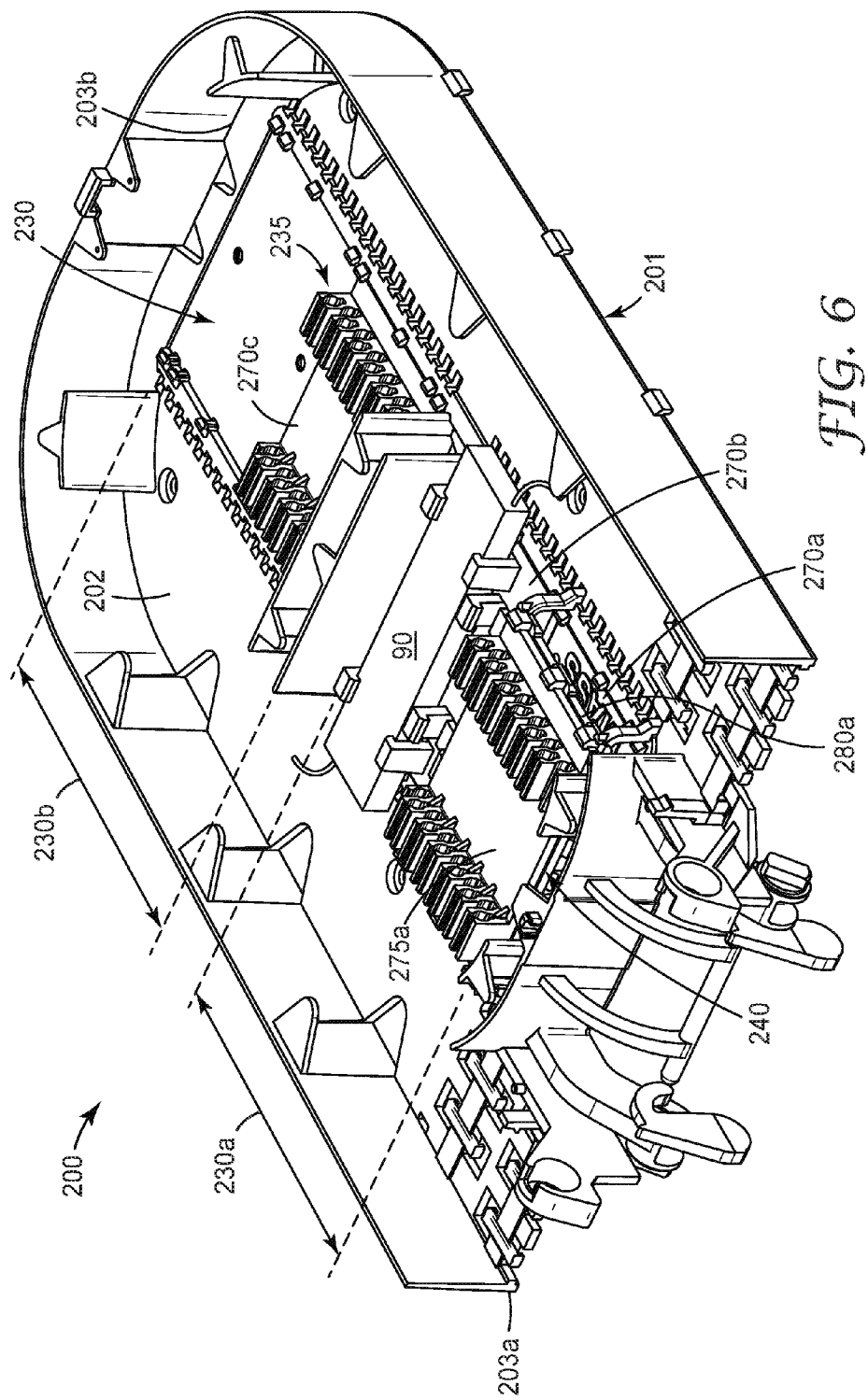
FIG. 6 is an isometric view of a second configuration of an optical fiber interconnection tray according to an aspect of the invention.

The base portion 271b of optical component insert 270b includes at least one device mounting area 272b. Each device mounting area is defined by a plurality of device holders 273b. Each device mounting area can hold a single passive and/or active optical device. In the exemplary embodiment shown in FIG. 7, two pairs of spaced apart device holders are positioned around each device mounting area. Device holders 273b can be grouped opposite each other on either side of the device mounting area or the device holders may be staggered to provide a multi-point load on the splitter or other optical component held by optical component insert 270b. The device holders can be constructed of a resilient material. Each device holder 273b includes a protruding edge 274b disposed near the free end of the device holder such that the protruding edge for a given device holder pair face each other and overhang the device mounting area that runs between them. These protruding edges are configured to engage with an optical component when it is inserted in the device mounting area of the optical component insert to securely hold the optical component in place as shown in FIG. 6.

Figure 4A:
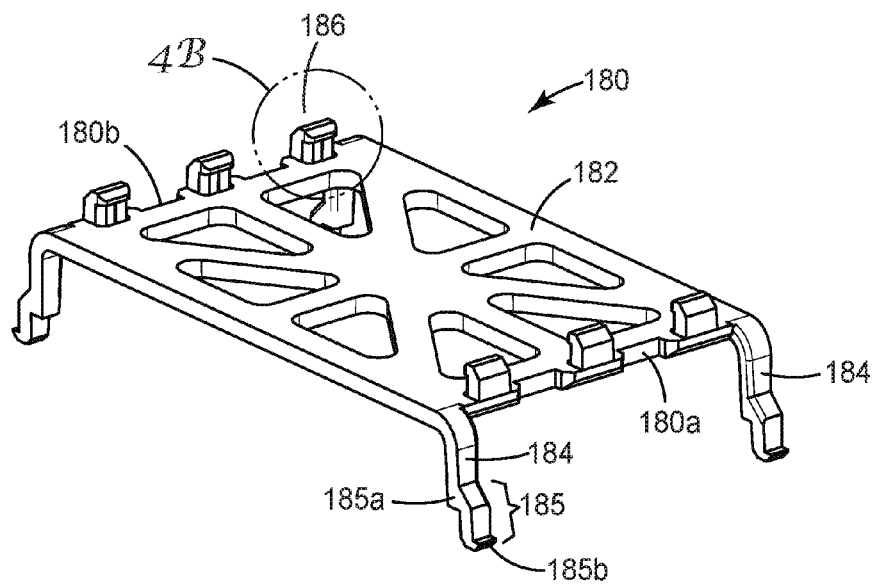
FIG. 4A is an isometric view of a repositionable mezzanine that can be used in the optical fiber interconnection tray of FIG. 2.
Figure 4B:
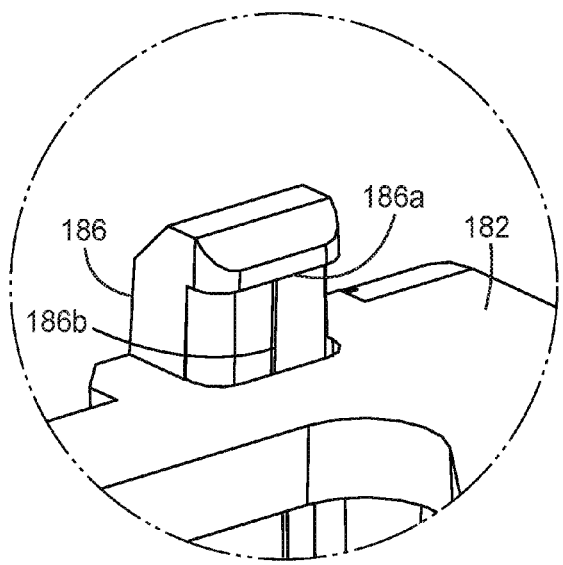
FIGS. 4B and 4C are detail views of the repositionable mezzanine of FIG. 4A.
Figure 4C:
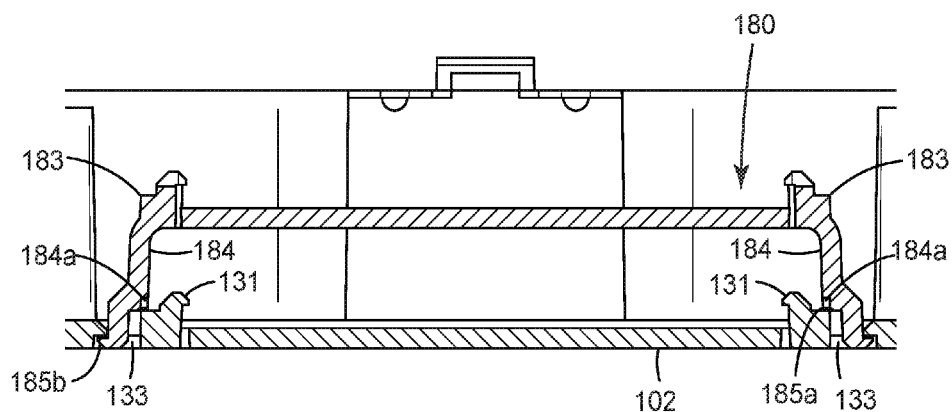

Referring to FIG. 4A, repositionable mezzanine 180 can be a table-like structure comprising a generally rectangular surface panel 182 and four legs 184 wherein two of the legs extend from a first edge 180a of the support panel and the other two legs extending from a second edge 180b of the support panel that is opposite the first edge. Each leg includes a foot portion 185 disposed at the end of leg that aids in securing the repositionable mezzanine to the base 102 of the tray body. The foot portion includes a heel 185a that rests on the lip of an opening 133 and the toe 185b hooks into a recess formed in a side of the opening adjacent the bottom side of the base 102 as shown in FIG. 4C. In this way, repositionable mezzanine can be secured to the base of the interconnection tray over a first of optical component insert of the first interconnection layer. In an exemplary aspect, interconnection tray 100 can have a linear array of openings 133 disposed adjacent to interconnection area 130 to allow the repositionable mezzanines to be placed anywhere along the length of the interconnection tray as shown for example in FIG. 3B. The repositionable mezzanines described herein can be injection molded plastic structures or can be made from a stamped and folded metal sheet.

The second optical component insert 170 can be secured to the support panel 182 of the repositionable mezzanine 180 by an adhesive, such as a piece of double sided tape or a transfer adhesive, or by engaging with second facing insert catches 186 disposed along opposing edges of repositionable mezzanine e.g. along the first and second edges of the support panel. A detail view of facing insert catches 186 is provided in FIG. 4B. Insert catch 186 includes an overhanging portion 186a at its free end. The overhanging portion is configured to vertically constrain or secure the second optical component insert 175 between the overhanging portion and panel 182. Insert catch 186 can further include a ridge 186b to grip the second optical component insert constraining it laterally in two dimensions.

Figure 5A:
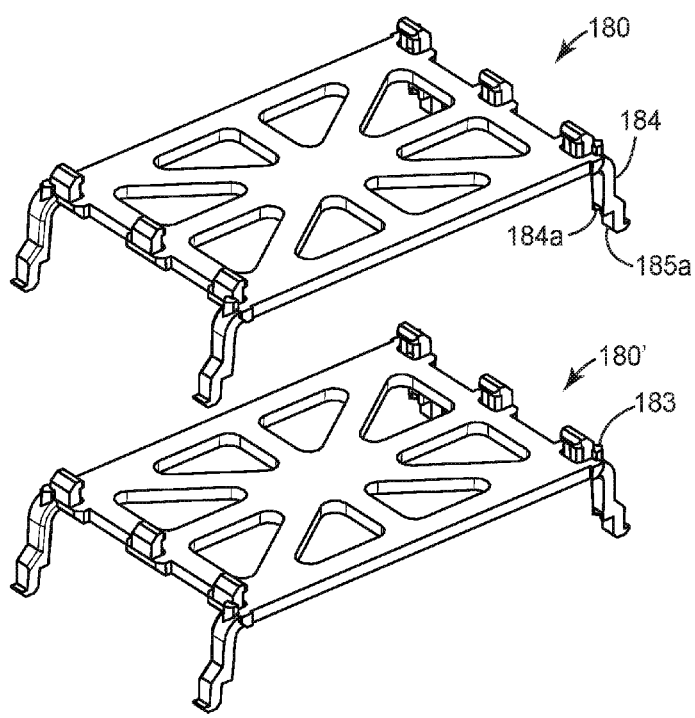
FIGS. 5A-5C show the nesting of two repositionable mezzanines according to an aspect of the invention.
Figure 5B:
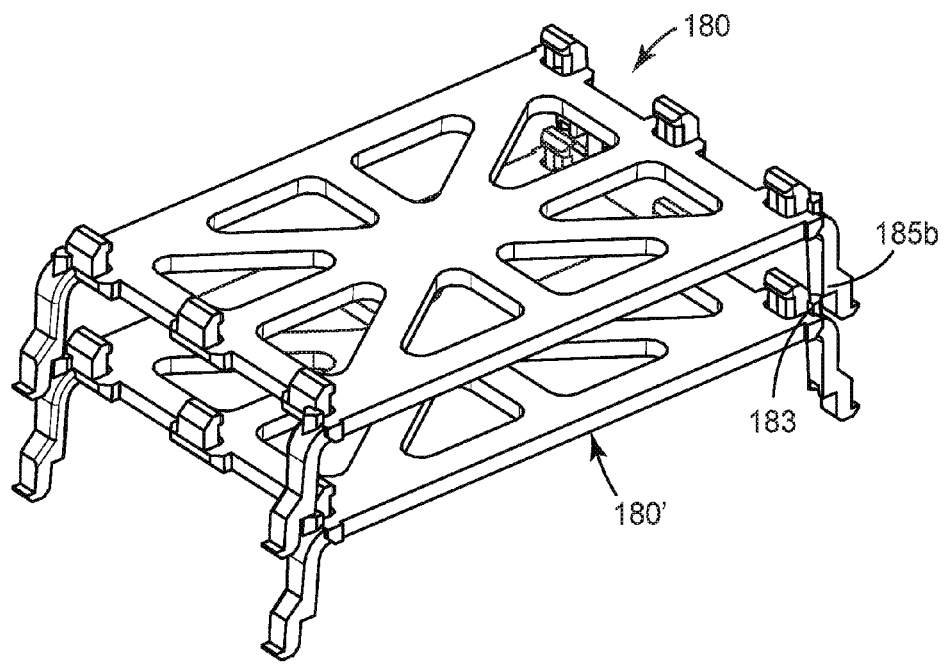
Figure 5C:
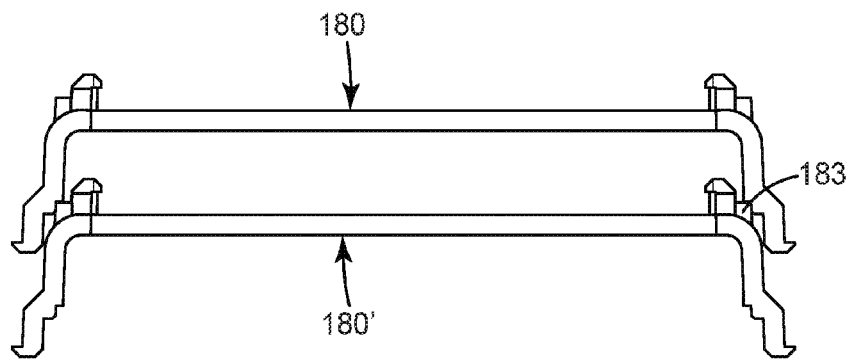

During installation or maintenance of an enclosure containing the exemplary tray, the craftsman may need to access fiber connections on the first inter connection layer. The legs 184 can be squeezed toward each other to release the repositionable mezzanine 180 from the interconnection tray 100. The repositionable mezzanines can include interlocking features 183, 184a that allow two or mezzanines, such as a first repositionable mezzanine 180, and a second repositionable mezzanine 180', to be nested so that the first repositionable mezzanine 180 an be placed on top of the second repositionable mezzanine 180' as shown in FIGS. 5A-5C. Thus, the first repositionable mezzanine is held out of the way allowing access to the first interconnection layer originally housed beneath the first repositionable mezzanine. For example, repositionable mezzanines 180, 180' can have a projection 183 disposed at the top of each leg 184 that engages with a notch 184a in the heel 185b of another repositionable mezzanine that is stacked on top the repositionable mezzanine. When the work on the first interconnection layer is completed, the first (or top) repositionable mezzanine can be lifted off of the other mezzanine and secured to the base of the interconnection tray in its original position.

The optical component inserts can be any of the types described above in any combination. When the exemplary tray is being configured as a simple splice closure for non-ribbonized optical fibers, the first and second optical component inserts can be single fiber fusion splice insert or single mechanical splice insert or when the exemplary tray is being configured as a simple splice closure for ribbonized optical fibers, the first and second optical component inserts can be mass fusion splice inserts or mass mechanical splice inserts. In an alternative aspect, the first and second optical components can include a combination of the splice inserts described above. Exemplary tray 100 has space for a total of eight splice inserts (i.e. four first splice inserts in the first interconnection layer and four second splice inserts in the second interconnection layer). If interconnection tray 100 is fully outfitted with mechanical splice inserts, the tray can hold a total of 48 mechanical splices such as 3M™ Fibrlok™ II Universal Optical Fiber Splice 2529 or 3M™ Fibrlok™ 250 µm Fiber Splice 2540 available from 3M company (St. Paul Minn.). If interconnection tray 100 is fully outfitted with single fusion splice inserts, the tray can hold a total of 96 fusion splice sleeves. If interconnection tray 100 is fully outfitted with mass fusion splice inserts, the tray can hold a total of for example 48—twelve fiber mass fusion splices giving a tray with a splice capacity of 572 optical fibers. Higher splice capacities can be achieved by using a longer interconnection tray that can hold more optical component insert and are considered within the scope of the present disclosure. The features of interconnection tray can be adapted to interconnection trays of many different sizes and shapes to yield higher optical component capacities than conventional trays.

Figure 7:
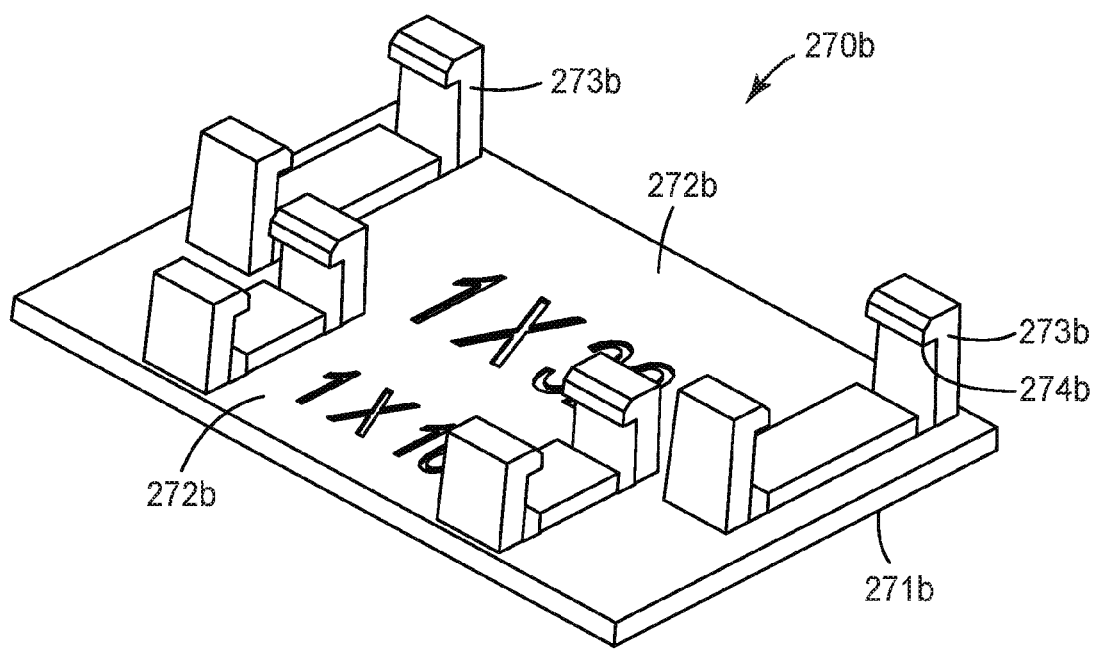
FIG. 7 is an isometric view of an exemplary optical component insert according to an aspect of the invention.

In installations splitting of the signal carried on a single inlet fiber can be divided between a plurality of output fibers by an optical splitter. In this instance, at least one of the first and second optical component inserts can be an optical splitter insert as shown in FIG. 7. FIG. 6 shows a first configuration of interconnection tray 200 having this configuration. This tray configuration might be the tray configuration during initial installation of an enclosure connecting a limited number of end users such as when a fiber network is extended into a new area or neighborhood. As the network is extended additional cables may need to be interconnected in interconnection tray 200' shown in FIGS. 8A and 8B requiring additional optical component inserts can be added to the existing tray (i.e. interconnection tray 200). Interconnection tray 200 is shown in FIG. 6. Tray body 201 of interconnection tray 200 is analogous to tray body 101 of interconnection tray 100 shown in FIGS. 2A and 3 and as such the details of interconnection tray 200 will not be re-iterated here except as it pertains to the new configuration shown in FIG. 6. Interconnection tray 200 includes a first interconnection layer 235 disposed in the interconnection area 230 on the base 202 of the tray body, and a second interconnection layer 240 positioned over at least a portion of the first interconnection layer, wherein the second interconnection layer is disposed on a first repositionable mezzanine 280a attached to the base in a first zone 230a near the first end 203a of the base.

First interconnection layer 235 comprises a first plurality of optical component inserts 270 (e.g., 270a, 270b and 270c) disposed on the base 202 of the interconnection tray, such that optical component inserts 270a and 270b are disposed in the first zone 230a of interconnection area 230 and optical component inserts 270c is disposed in a second zone 230b of interconnection area near the second end 203b of base 202. Specifically, optical component insert 270a is a mass fusion insert to splice optical fiber ribbon cables; optical component insert 270b is an optical splitter inset which holds a 1×32 optical splitter 90 which accepts the optical signal from a single input fiber and divides it over 32 output fibers; and optical component insert 270c is fusion splice insert that accepts 3 mm splice sleeves (not shown).

Second interconnection layer 240 include one optical component inserts 275a, disposed on repositionable mezzanine 280a. Repositionable mezzanine 280a is secured to the base 202 of interconnection tray 200 over optical component insert 270a on the first interconnection layer 235.

Figure 8A:
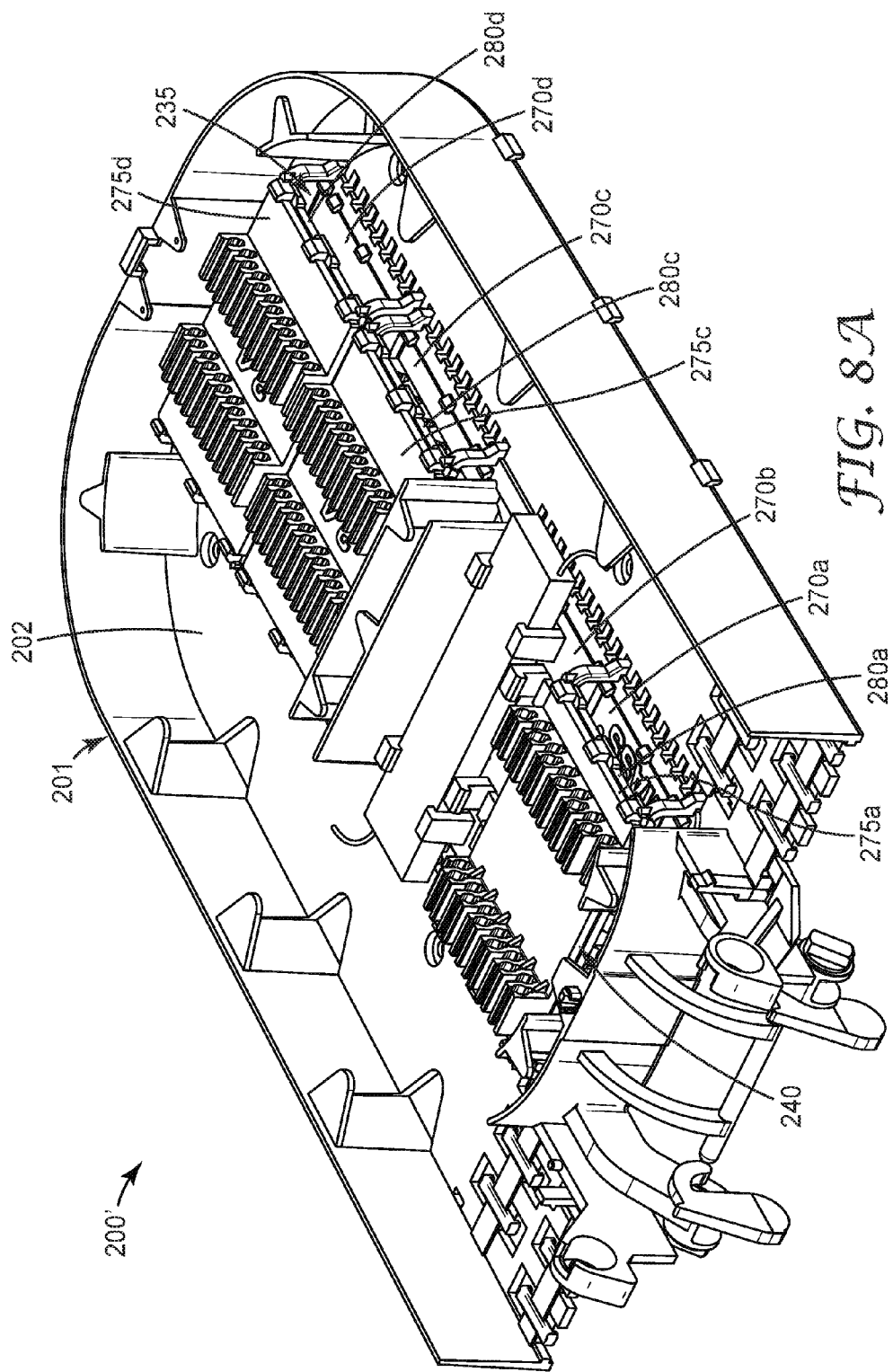
FIGS. 8A and 8B are two views of a modified configuration of the optical fiber interconnection tray according of FIG. 6.
Figure 8B:
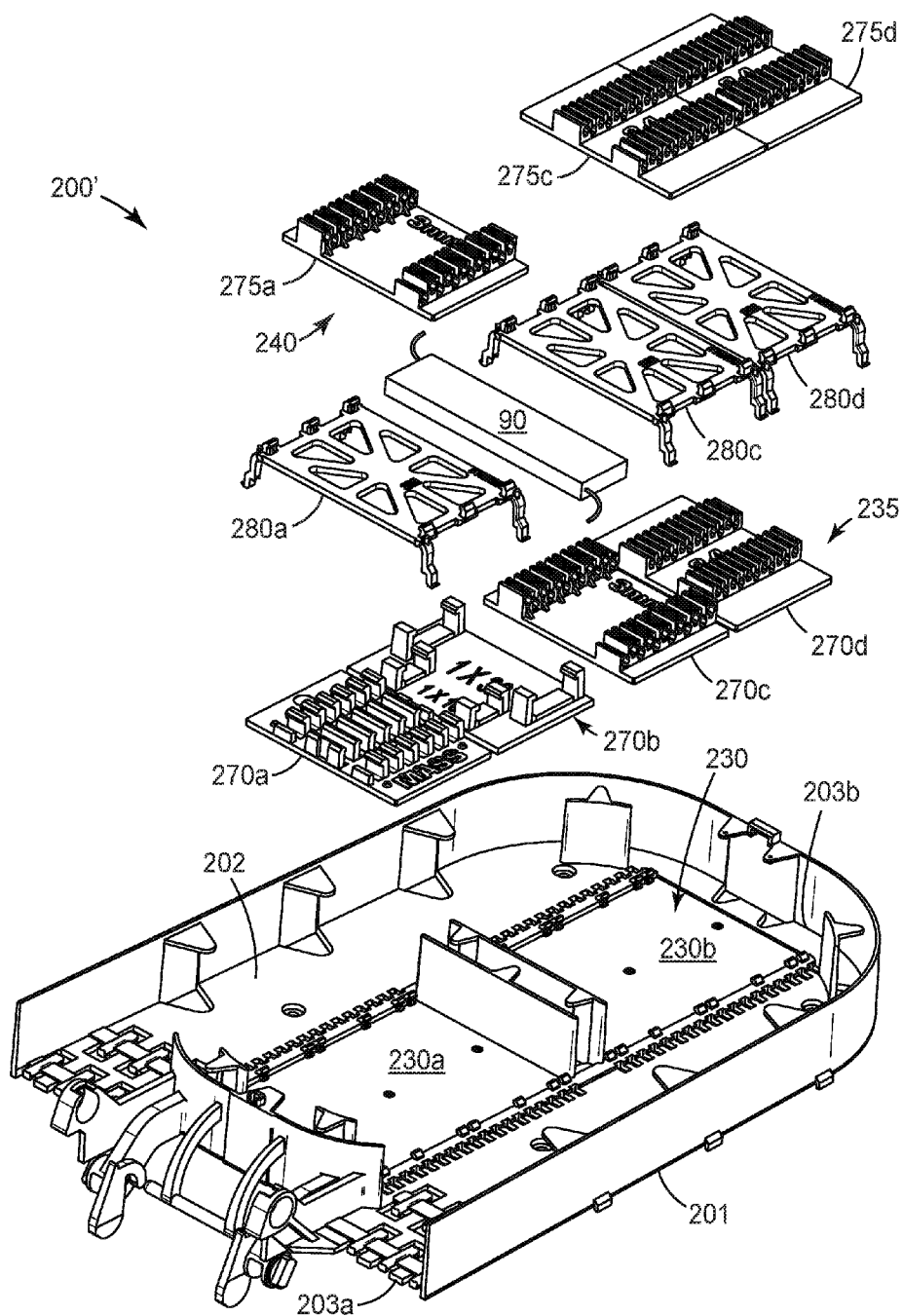

FIGS. 8A and 8B are two views of a modified configuration interconnection tray 200 shown in FIG. 6 which may result from a building out of a network to supply fiber optic service to more end users. Additional optical fiber connections have been added to interconnection tray 200' in the form of one additional optical component insert 270d in the second zone 230b of the first interconnection layer 235 and two additional optical components 275c, 275d on repositionable mezzanines 280c, 280d in the second zone 230b of the second interconnection layer 240 over optical component inserts 270c, 270d on the first interconnection layer 235.

Note that the capacity of interconnection tray 200' can be further expanded by adding an additional repositionable mezzanine and optical component insert over optical component insert 270b in first interconnection layer 235.

Figure 9A:
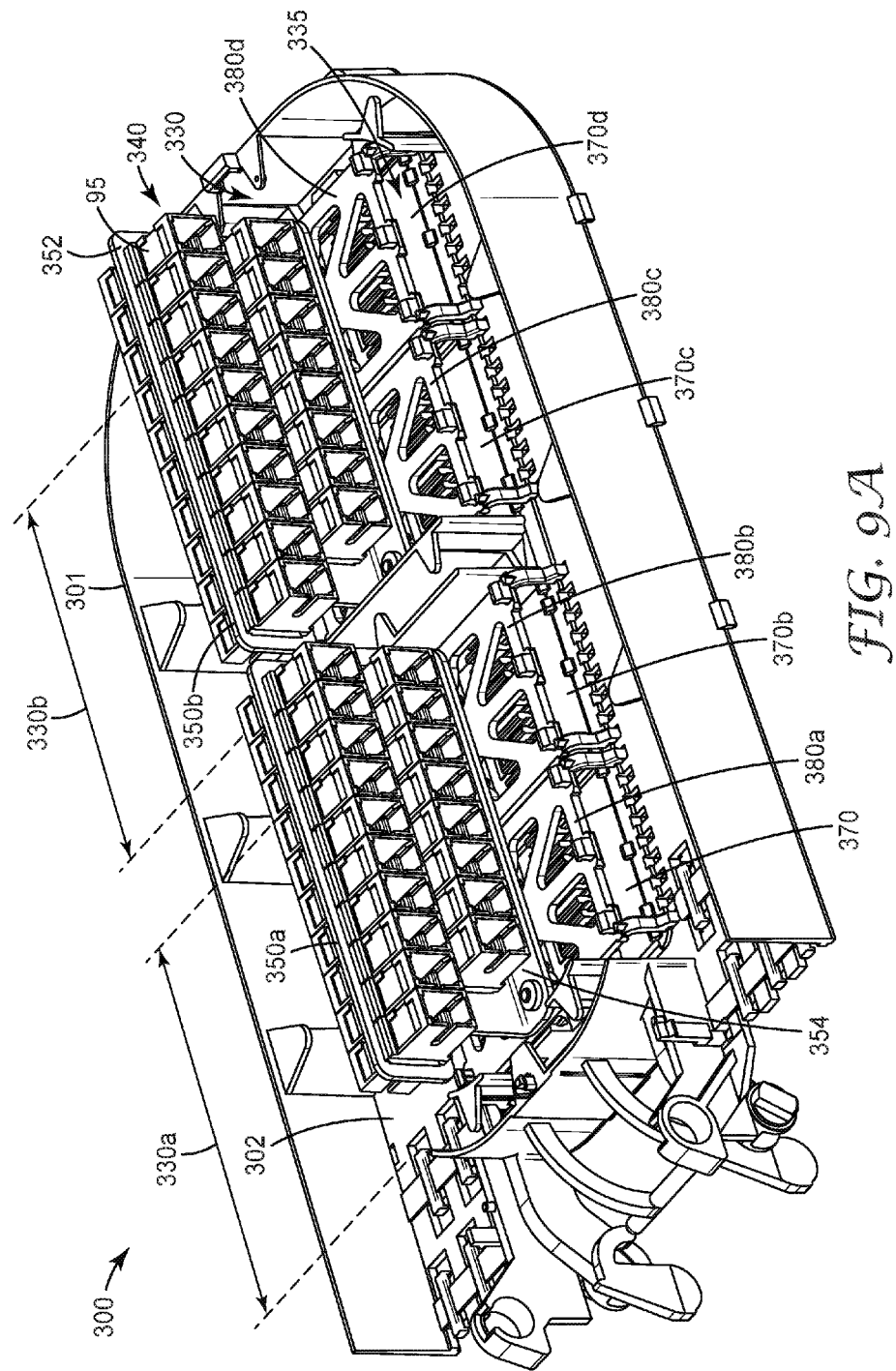
FIGS. 9A and 9B are two views of a third configuration of an optical fiber interconnection tray according to an aspect of the invention.
Figure 9B:
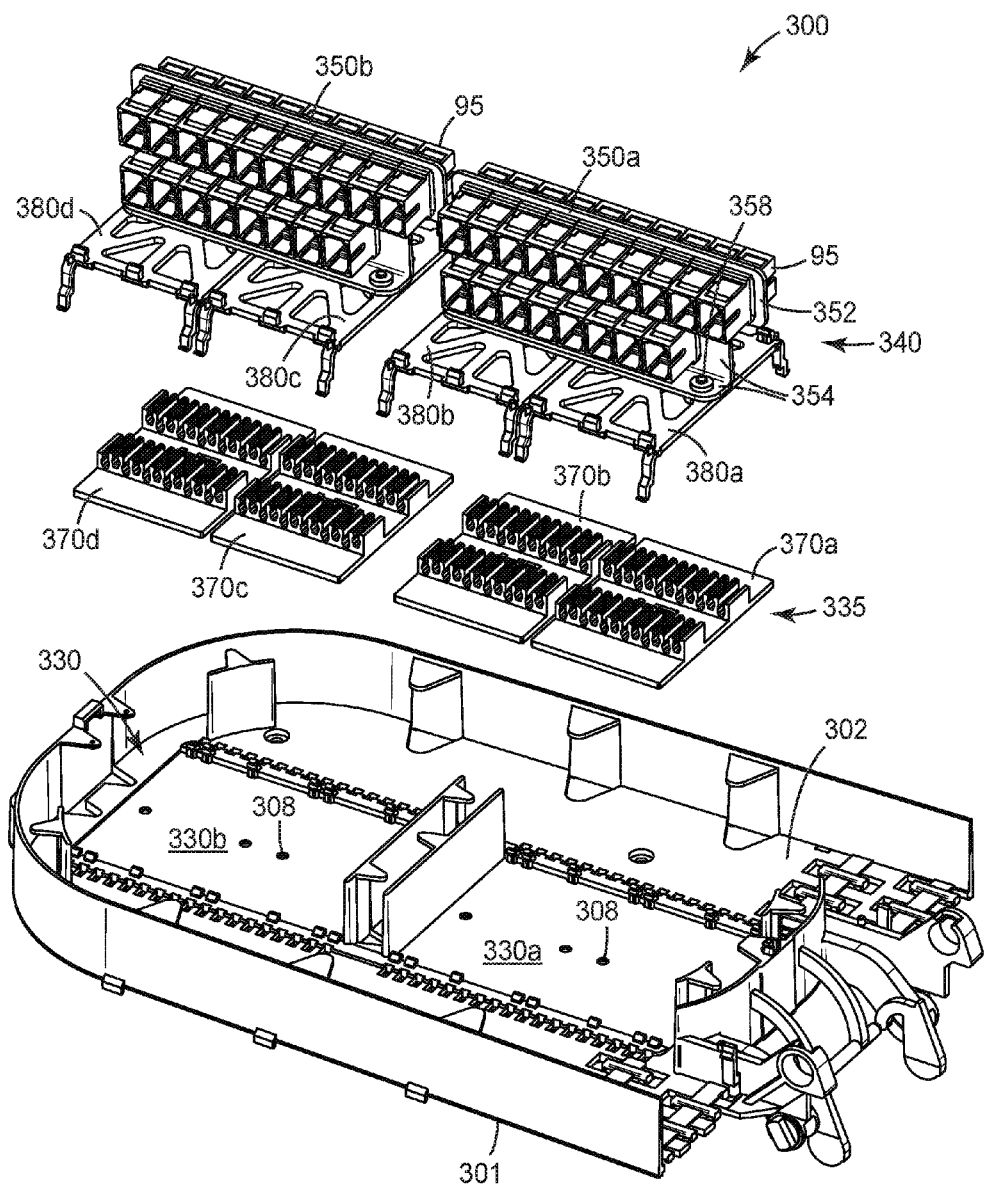

In some installations, optical fiber connector patching within a communication enclosure is desired. FIGS. 9A and 9B show an exemplary interconnection tray having an optical fiber connector adapter patch field as the second interconnection layer. Tray body 301 of interconnection tray 300 is analogous to tray body 101 of interconnection tray 100 shown in FIGS. 2A and 3 and as such the details of interconnection tray 300 will not be reiterated here except as it pertains to the new configuration shown in FIGS. 9A and 9B. Interconnection tray 300 includes a first interconnection layer 335 disposed in the interconnection area 330 on the base 302 of the tray body 301, and a second interconnection layer 340 positioned over at least a portion of the first interconnection layer, wherein the second interconnection layer comprises at least one optical fiber connector adapter patch field disposed on repositionable mezzanines 380 (e.g. mezzanines 380a-380d).

First interconnection layer 335 comprises a first plurality of optical component inserts 370 (e.g. optical component inserts 370a-370d) disposed on the base 302 of the interconnection tray, such that optical component inserts 370a and 370b are disposed in the first zone 330a of interconnection area 330 and optical component inserts 370c and 370d are disposed in a second zone 330b of interconnection area near the second end 303b of base 302. Specifically, optical component inserts 370a are fusion splice inserts that accepts 2.4 mm splice sleeves (not shown).

Second interconnection layer 340 includes two optical fiber connector adapter patch field disposed on repositionable mezzanines 380. The repositionable mezzanines 380a, 380b are secured to the base 302 of interconnection tray 300 over optical component insert 370a, 370b in the first zone 330a of on the first interconnection layer 335 and repositionable mezzanine 380c, 380d are secured to the base 302 of interconnection tray 300 over optical component insert 370c, 370d in the second zone 330b of on the first interconnection layer 335.

Optical fiber connector adapter patch field 350a, 350b includes a flat adapter mounting plate 352 attached to a mounting foot 354. In one exemplary aspect, the adapter mounting plate can be oriented perpendicular with respect to the base 302 of interconnection tray 300. In another exemplary aspect, the adapter mounting plate can be disposed at an angle that deviates less than about 20° from perpendicular, preferably having a deviation of less than or equal to 10° from perpendicular with respect to the base of interconnection tray 300.

Figure 10:
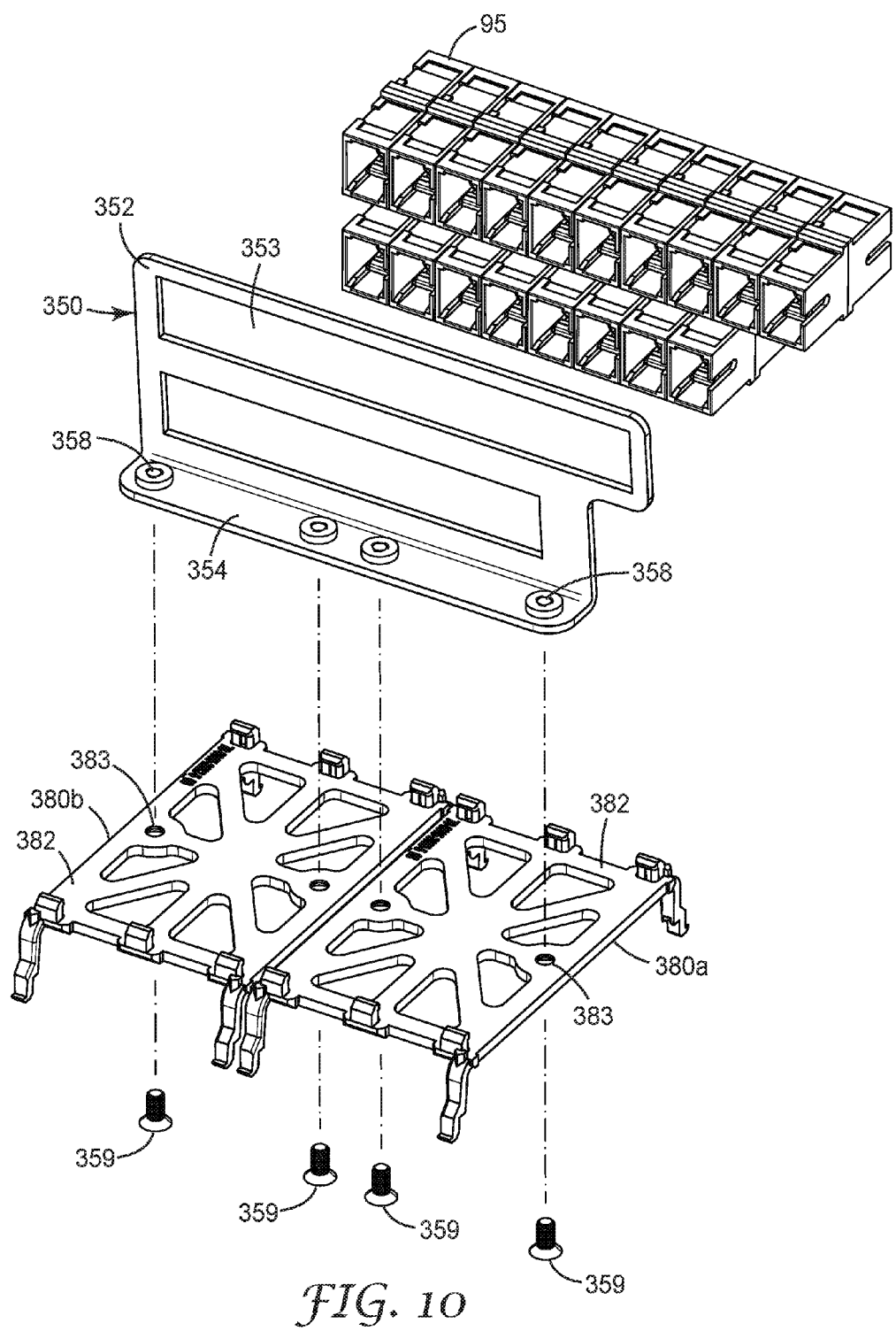
FIG. 10 is an exploded isometric view of an exemplary optical fiber connector adapter patch field according to an aspect of the invention.

Flat adapter mounting plate 352 has at least one slot that is configured to accept and hold a plurality of connector adapters. The number and length of the slots control how many connector adapters can be held by the flat adapter mounting plate. Flat adapter mounting plates 352 in FIGS. 9A-9B and FIG. 10 are configured to hold 18 SC format connector adapters 95. LC connector adapters can replace the SC adapter shown in the figures resulting in twice as many LC optical fiber connector interconnections.

Flat adapter mounting plate 352 and mounting foot 354 can be formed of a single stamped and bent piece of sheet metal, can be formed from injection molding an engineering grade resin material or can be made as two separate pieces that a welded, bonded or otherwise joined together.

Mounting foot 354 can be secured to the surface panels 382 of repositionable mezzanines 380 with mechanical fasteners such as by nuts 358 and screws 359. The screws can pass through mounting holes 383 in the surface panels of the repositionable mezzanines and through openings in the mounting foot of the optical fiber connector adapter patch field 350 where it is secured by threadably connecting the nuts on the shafts of the screws. The repositionable mezzanines holding the optical fiber connector adapter patch field can be secured to interconnection tray as described previously. In an alternative configuration, optical fiber connector adapter patch field 350 can be directly mounted to the base of interconnection tray 300 by passing the mechanical fasteners through mounting holes 308 that extend through base 302 of the interconnection tray 300.

Advantageous features of optical fiber connector adapter patch field 350 includes the ability to install two optical component inserts 370 below the optical fiber connector adapter patch field 350 and the optical fiber connector adapter patch field can be easily inserted and removed from the interconnection tray by simply squeezing the legs of the repositionable mezzanines together.

Retention in the tray should be good, since there are 8 mezzanine legs per adapter plate inserted into the tray.

Once the adapter plate is assembled to the mezzanines, then it becomes a snap-in/squeeze-to-release accessory.

Figure 11:
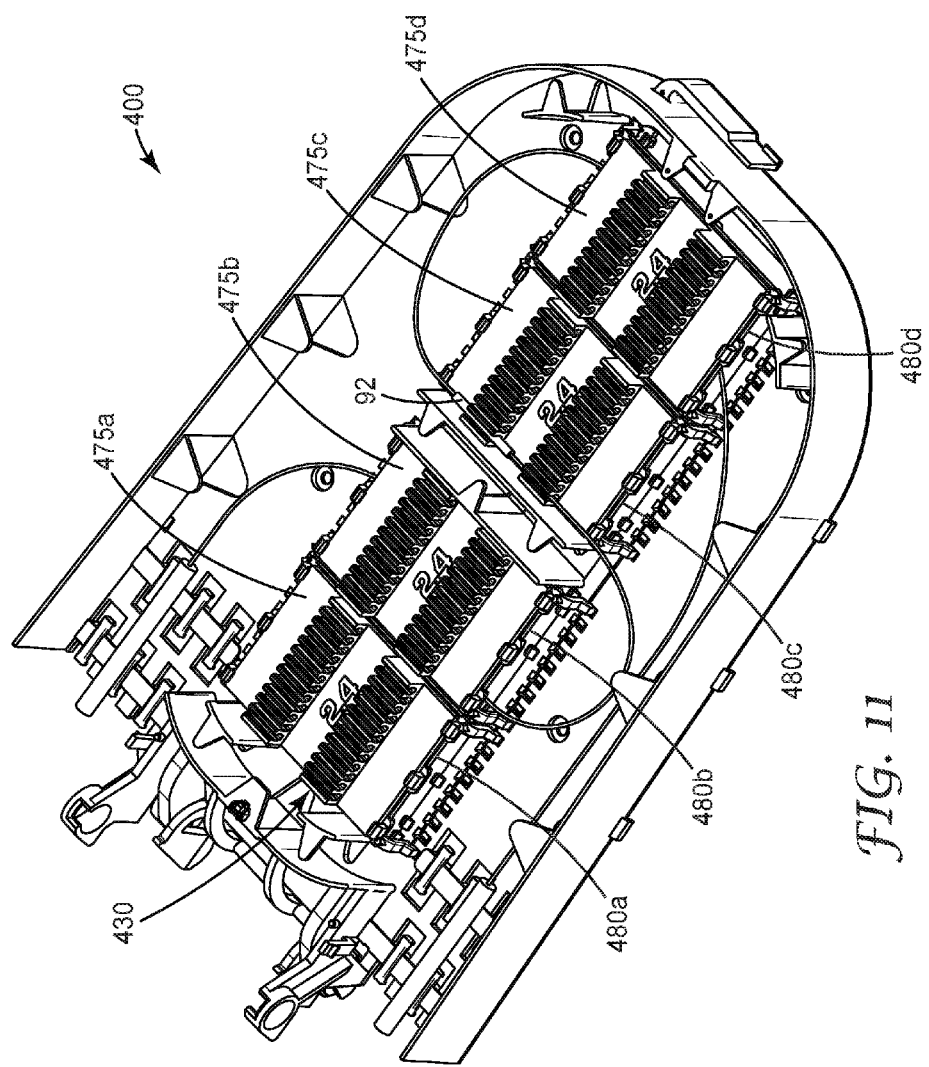
FIG. 11 is an isometric view of a fourth configuration of an optical fiber interconnection tray according to an aspect of the invention.

In some installations as shown in FIG. 11, the network designer would like to have greater amounts of excess fiber store on a given interconnection tray. Interconnection tray 400 uses repositionable mezzanines 480 (e.g. mezzanines 480a-480d) to create extra fiber storage area beneath the optical component inserts as shown in FIG. 11. In this exemplary embodiment, the optical fibers joined by fusion splice 92 are serpentine underneath the repositionable mezzanines which help separate the spliced optical fibers from slack cable loops (not shown) passing circumferentially around interconnection area 430.

Figure 12:
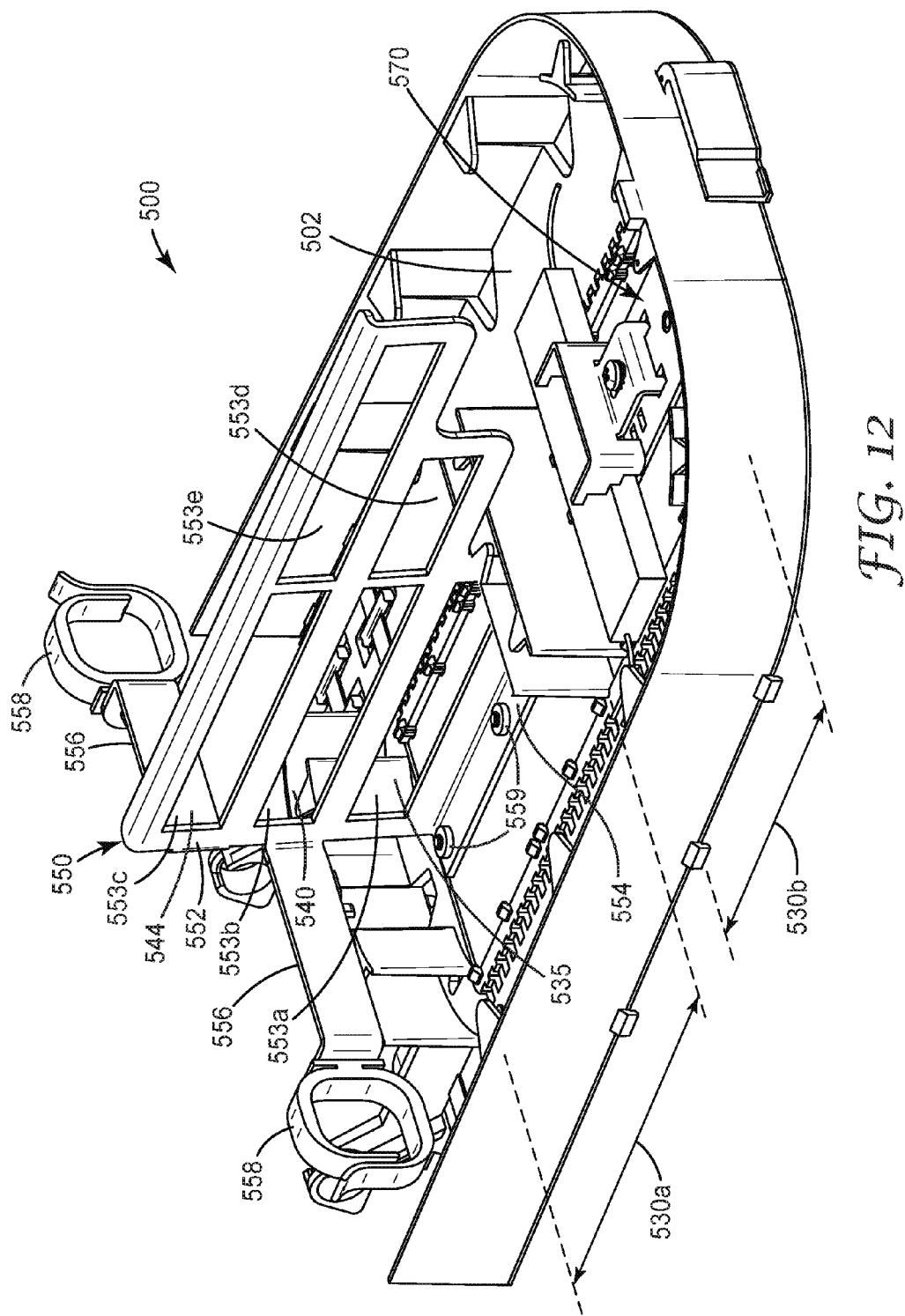
FIG. 12 is an isometric view of a fifth configuration of an optical fiber interconnection tray according to an aspect of the invention.

FIG. 12 shows another exemplary interconnection tray 500 having an optical fiber connector adapter patch field 550 disposed in a first zone 530a and an optical component holder 570 disposed in a second zone 530b of the interconnection tray, specifically an adjustable optical splitter insert 570 attached to the base 502 of the interconnection tray. Interconnection 500 is set up to provide interconnect patching of splitter output fibers and connectorized distribution or drop fibers. In an alternative aspect, adjustable optical splitter insert can be replaced with up to four other optical component inserts and two repositionable mezzanines.

Optical fiber connector adapter patch field 550 includes a flat adapter mounting plate 552 attached to a mounting foot 554. In one exemplary aspect, the adapter mounting plate can be oriented perpendicular with respect to the base 502 of interconnection tray 500. In another exemplary aspect, the principle plane of fiber optic connectors (not shown) and adapters also not shown) may not be disposed parallel to the principle plane of the base of the interconnection tray. The adapter mounting plate can be disposed at an angle that deviates less than about 20° from perpendicular, preferably having a deviation of less than or equal to 10° from perpendicular with respect to the base of interconnection tray 500.

Adapter mounting plate 552 includes a plurality of slots 553a-553e that are configured to accept and hold a plurality of connector adapters (not shown). The plurality of slots 553a-553e and therefore the connector adapters mounted in those slots are arranged on a plurality of interconnection levels, i.e. a first interconnection level 535, a second interconnection level 540 and a third interconnection level 544. The number and length of the slots control how many connector adapters can be held by the flat adapter mounting plate. Flat adapter mounting plate 552 is configured to hold 36 SC format connector adapters (not shown). LC connector adapters can replace the SC adapter shown in the figures resulting in twice as many LC optical fiber connector interconnections.

Flat adapter mounting plate 552 and mounting foot 554 of optical fiber connector adapter patch field 550 can be formed of a single stamped and bent piece of sheet metal, can be formed from injection molding an engineering grade resin material or can be made as two separate pieces that are welded, bonded or otherwise joined together.

Mounting foot 554 can be secured to the surface of base 502 by mechanical fasteners such as screws 559 or by a strip of adhesive such as a 3M™ VHB™ Tape. The mechanical fasteners can pass through mounting holes, such as mounting holes 308 shown in FIG. 9B, in the base of the interconnection tray 500. In the exemplary aspect shown in FIG. 12, optical fiber connector adapter patch field 550 is secured in the first zone 530a of interconnection area of interconnection tray 500.

Optical fiber connector adapter patch field 550 can optionally include one or more extension members 556 extending from the flat adapter mounting plate 552. A cable management ring 558 can be disposed on the free end of each of the extension members to manage the optical fibers (not shown) that are interconnected by the optical fiber connector adapter patch field.

Because the external dimensions of optical fiber splitters can vary, it can be difficult to find a single optical splitter insert that is capable of holding a broad array of different sized optical splitters. Adjustable optical splitter insert 570 is adjustable so that it can hold a variety of different sized optical splitters (e.g. a 1×8 optical splitter, a 1×16 optical splitter, or a 1×32 optical splitter) or it can hold a plurality of small optical splitters (e.g. a plurality of 1×2 optical splitters, or a plurality of 1×4 optical splitters. In addition, it is anticipated that this type of component insert or holder can accommodate other small optical components such as wavelength division multiplexing devices, fan-out devices or furcation bodies, and the like.

Figure 13A:
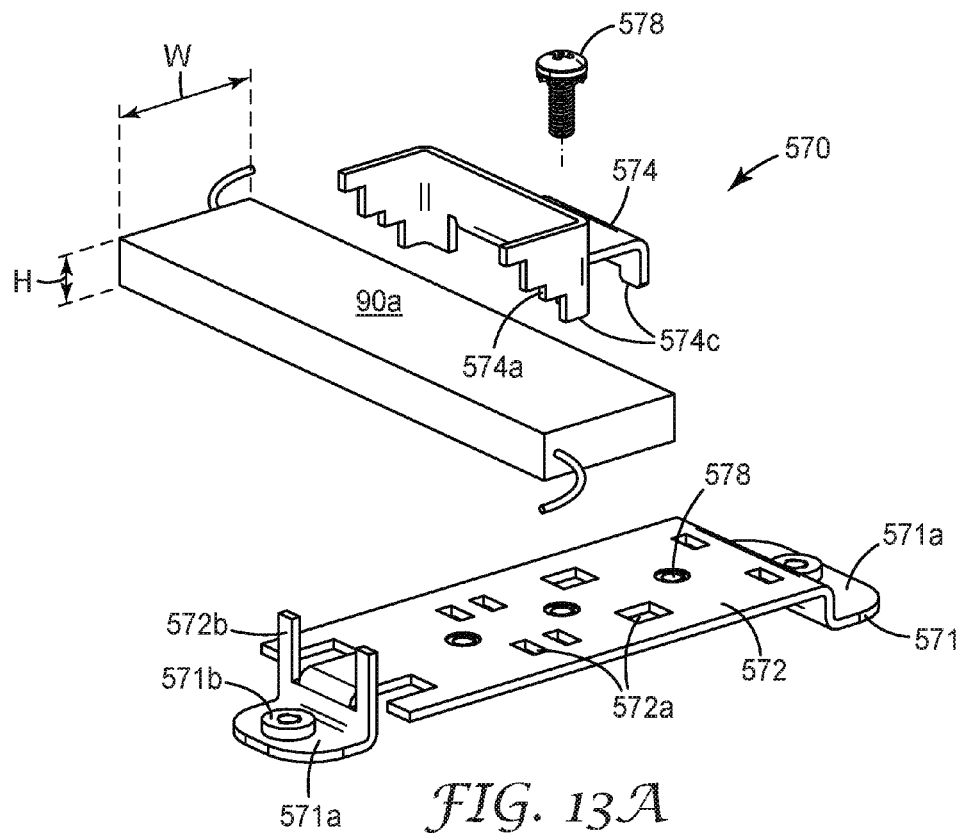
FIGS. 13A-13D are isometric views of an exemplary optical component inserts according to an aspect of the invention.
Figure 13B:
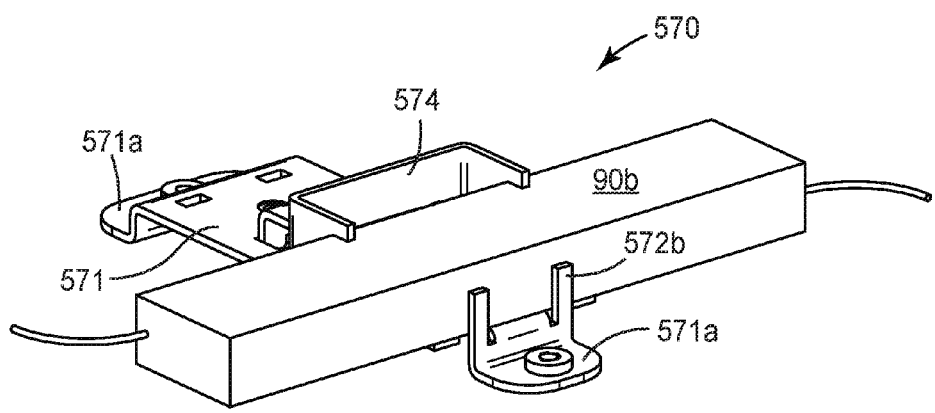

Referring to FIGS. 13A-13B, adjustable optical splitter insert 570 includes a base portion 571 having a generally rectangular shape with mounting flanges 571a disposed on either longitudinal end of the base portion. Base portion 571 can be secured to the surface of base 502 by mechanical fasteners such as screws (not shown) or by a strip of adhesive such as a 3M™ VHB™ Tape. The mechanical fasteners can pass through mounting holes in the base portion of the adjustable optical splitter insert and mounting holes in the base of the interconnection tray 500. In the exemplary aspect shown in FIG. 12, adjustable optical splitter insert 570 is secured in the second zone 530b of interconnection area of interconnection tray 500.

The base portion 571 of adjustable optical component insert 570 includes at least one device mounting area 572. The device mounting area has a stop 572b at one end of the device mounting area, a plurality locating openings 572a formed through the base portion of the adjustable optical splitter insert. Positioning tabs 574c extending from brace member 574 fit into the locating openings on the base portion of the adjustable optical splitter insert to accommodate different widths, W, of optical splitters, such as optical splitter 90a.

Brace member 574 has a stepped portion 574a that interfaces with the optical splitter to be held by the adjustable optical splitter insert 570 wherein the steps accommodate variations in the height of different optical splitters. In the embodiment shown in FIG. 13B, the stepped portion has three steps in the exemplary adjustable optical splitter insert shown. Thus, this adjustable optical splitter insert shown is able to grip three different heights of optical splitters.

Figure 13C:
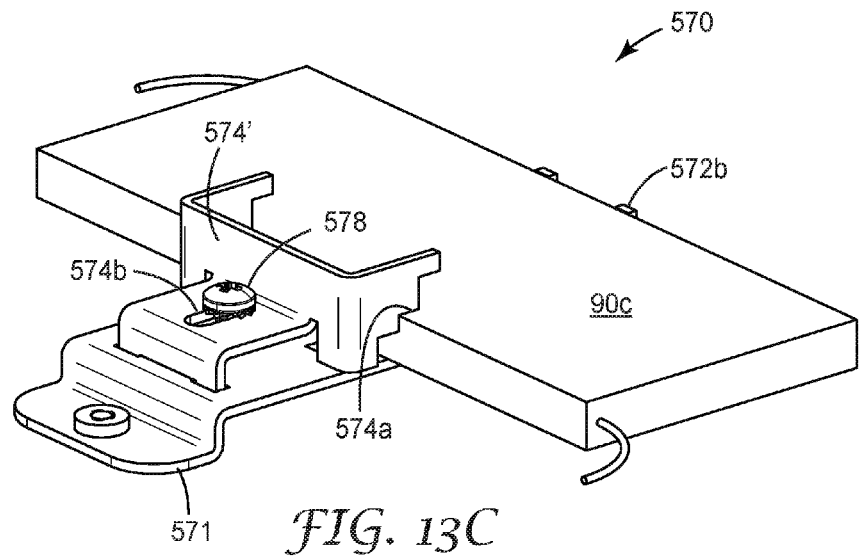

FIG. 13A shows adjustable optical splitter insert holding optical splitter 90b that engages with the top most step in stepped portion 574a, while FIG. 13C shows adjustable optical splitter insert holding optical splitter 90c that engages with the middle step in stepped portion 574a.

To mount an optical splitter in adjustable optical splitter insert 570, the optical splitter is placed on the device mounting area 572 so that one longitudinal side of the splitter rests against stop 572b. Next, brace member 572 is abutted up against the opposite longitudinal side of the optical splitter such that the top face and side faces of the optical splitter are positioned on one of the steps on the stepped interface. The positioning tabs 574c extending from brace member 572 are fitted into the appropriate locating openings 572a on the base portion 571 of the adjustable optical splitter insert and a mechanical fastener 578 is used to secure the brace member to the base portion of the adjustable optical splitter insert.

Figure 13D:
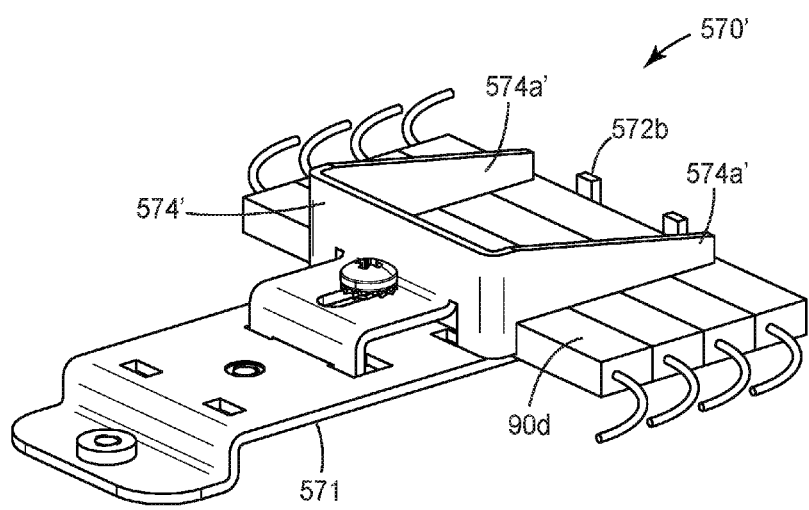

FIG. 13D shows an alternative adjustable optical splitter insert 570' that is configured to hold a plurality of smaller optical splitters 90d. In this exemplary embodiment, brace member 574' has a pair of arms 574a' extending from one side of the brace member. Arms 574a' contact the top surface of the optical splitters being held so that the optical splitters are secured by the arms and the base portion of the alternative adjustable optical splitter insert.

The exemplary interconnection trays described herein have several advantageous features. The exemplary interconnection tray can be deeper that conventional trays without compromising on interconnection density enabling storage of larger amounts of fiber including ribbonized optical fibers. The fiber chase provides an optical fiber crossover channel that increases the flexibility of fiber routing in the tray. The repositionable mezzanines enables the elevation of some optical component inserts providing increased connection capacity. The exemplary interconnection tray is compatible with a number of auxiliary component including optical splitter inserts, optical fiber fanouts, and optical fiber connector adapter patch field. The interconnection tray described herein includes an integrated hinge mechanism that enables easier access to all trays hosed within a communication enclosure.

Interconnection tray of the present disclosure is a highly configurable tray to be used in a butt style dome closure as shown in FIG. 1. However, the concepts and teachings of the present disclosure can also be used for interconnection trays used in an inline closure with only minor changes to the shape and features of the tray body. For an inline closure, the tray would be rectangular and would have at least one cable entrance at each end of the tray. In an exemplary aspect an interconnection tray for an inline closure would have a cable entrance at each corner aligned with the longitudinal axis of the tray.

The interconnection trays of the present disclosure are shown as being hinged trays which can be mounted on another similar interconnection tray. Interconnection trays which can be rotatably mounted to a centralized mounting structure and simplified stacking trays that do not include a hinge mechanism are contemplated and considered to fall within the scope of the present disclosure.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

The invention claimed is:

1. A optical fiber interconnection tray comprising:
   a base extending longitudinally from a first end to a second end, wherein the base includes a cable entrance at the first end of the tray,
   a first interconnection layer disposed on the base,
   a second interconnection layer positioned over at least a portion of the first interconnection layer, wherein the second interconnection layer is disposed on a first repositionable mezzanine attached to the base at a plurality of locations between the first end and the second end of the base; and
   a second mezzanine attached to the base of the tray, wherein the second mezzanine can be lifted from the base and nested on top of the first mezzanine to provide access to the first interconnection under the second mezzanine when the second mezzanine was attached to the base.

2. The interconnection tray of claim 1, further comprising a plurality of optical component inserts disposed within a shallow channel formed in the base wherein each of the plurality of optical component inserts is configured to hold a first plurality of optical components.

3. The interconnection tray of claim 2, wherein the first plurality of optical components can be selected from the optical splitters, mass fusion splices, single fusion splices, multifiber mechanical splices and mechanical splices.

4. The interconnection tray of claim 1, wherein the mezzanine has a generally rectangular panel, two legs extending from a first edge of the rectangular panel and two legs extending from a second edge of the rectangular panel that is opposite the first edge.

5. The interconnection tray of claim 4, wherein the mezzanine further includes a plurality of facing catches disposed along the first and second edges of the panel.

6. The interconnection tray of claim 5, wherein an optical component insert is secured onto the panel of the repositionable mezzanine by the plurality of facing catches, wherein optical component insert is configured to hold a second plurality of optical components.

7. The interconnection tray of claim 6, wherein the second plurality of optical components can be selected from the optical splitters, mass fusion splices, single fusion splices, multifiber mechanical splices and mechanical splices.

8. The interconnection tray of claim 1, wherein the second interconnection layer positioned over the entire first interconnection layer.

9. The interconnection tray of claim 8, wherein the first interconnection layer comprises a first plurality of optical component inserts disposed on the base of the interconnection tray, and wherein the second interconnection layer comprises a second plurality of optical component inserts, wherein each of the second plurality of optical inserts is disposed on a separate a repositionable mezzanine that is secured to the base of the interconnection tray over a corresponding one of first plurality of optical component inserts of the first interconnection layer.

10. The interconnection tray of claim 9, wherein the first plurality of optical component inserts and the second plurality of optical component inserts are configured to hold fusion splices.

11. The interconnection tray of claim 9, wherein the first plurality of optical component inserts and the second plurality of optical component inserts are configured to hold mechanical splices.

12. The interconnection tray of claim 1, further comprising a first interconnection zone and a second interconnection zone.

13. The interconnection tray of claim 1, further comprising a fiber routing channel between the first interconnection zone and the second interconnection zone.

14. The interconnection tray of claim 1, further comprising a connection mechanism disposed on the first end of the base, wherein the connection mechanism is configured to rotatably connect the interconnection tray to at least a second interconnection tray.

15. The interconnection tray of claim 1, wherein the base is wider at the first end of the base than at the second end of the base.

16. The interconnection tray of claim 1, further comprising an auxiliary strain relief plate disposed in the cable entrance to accommodate additional optical fibers entering and exiting the tray.

17. A optical fiber interconnection tray comprising:
  a base extending longitudinally from a first end to a second end, wherein the base includes a cable entrance at the first end of the tray;
  a plurality of optical component inserts, each insert disposed on a repositionable mezzanine so that the optical component insert is spaced above the base of the interconnection tray;
  a second mezzanine attached to the base of the tray, wherein the second mezzanine can be lifted from the base and nested on top of the first mezzanine to provide access to a slack storage region disposed under the second mezzanine when the second mezzanine was attached to the base; and
  a slack storage region disposed between the optical component inserts and the base of the interconnection tray.

* * * * *

UNITED STATES PATENT AND TRADEMARK OFFICE
CERTIFICATE OF CORRECTION

PATENT NO. : 9,494,760 B2
APPLICATION NO. : 15/001734
DATED : November 15, 2016
INVENTOR(S) : Simmons et al.

Page 1 of 1

It is certified that error appears in the above-identified patent and that said Letters Patent is hereby corrected as shown below:

In the Claims

Column 15,
Line 9, after "separate" delete "a".

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*